Figure 1:
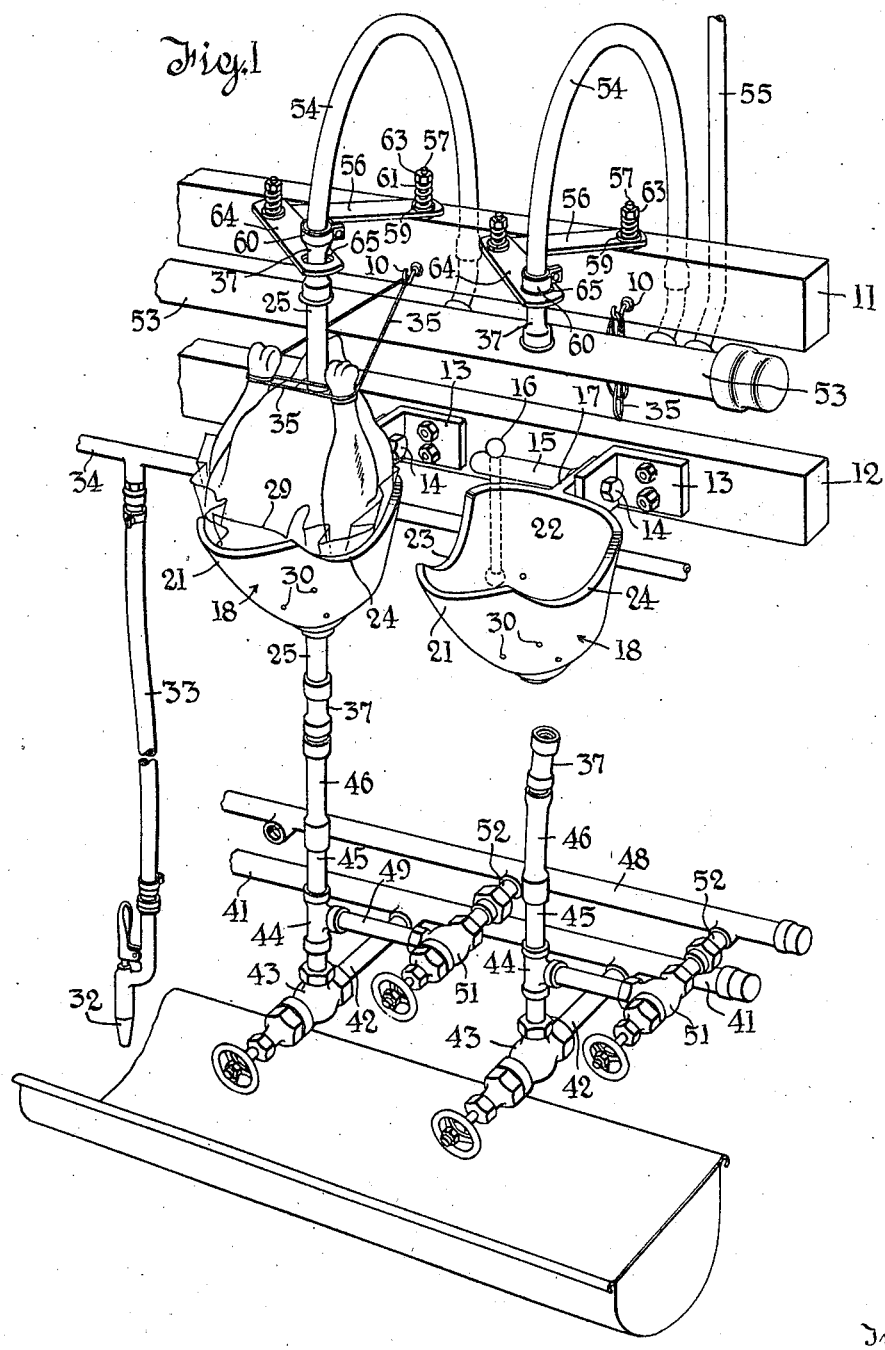

Jan. 19, 1943. J. N. CRIDER 2,309,046
APPARATUS FOR PRESERVING DRESSED AND DRAWN FOWL
Original Filed Dec. 12, 1936 2 Sheets-Sheet 1

Inventor
John N. Crider
By Dodge and Sons
Attorneys

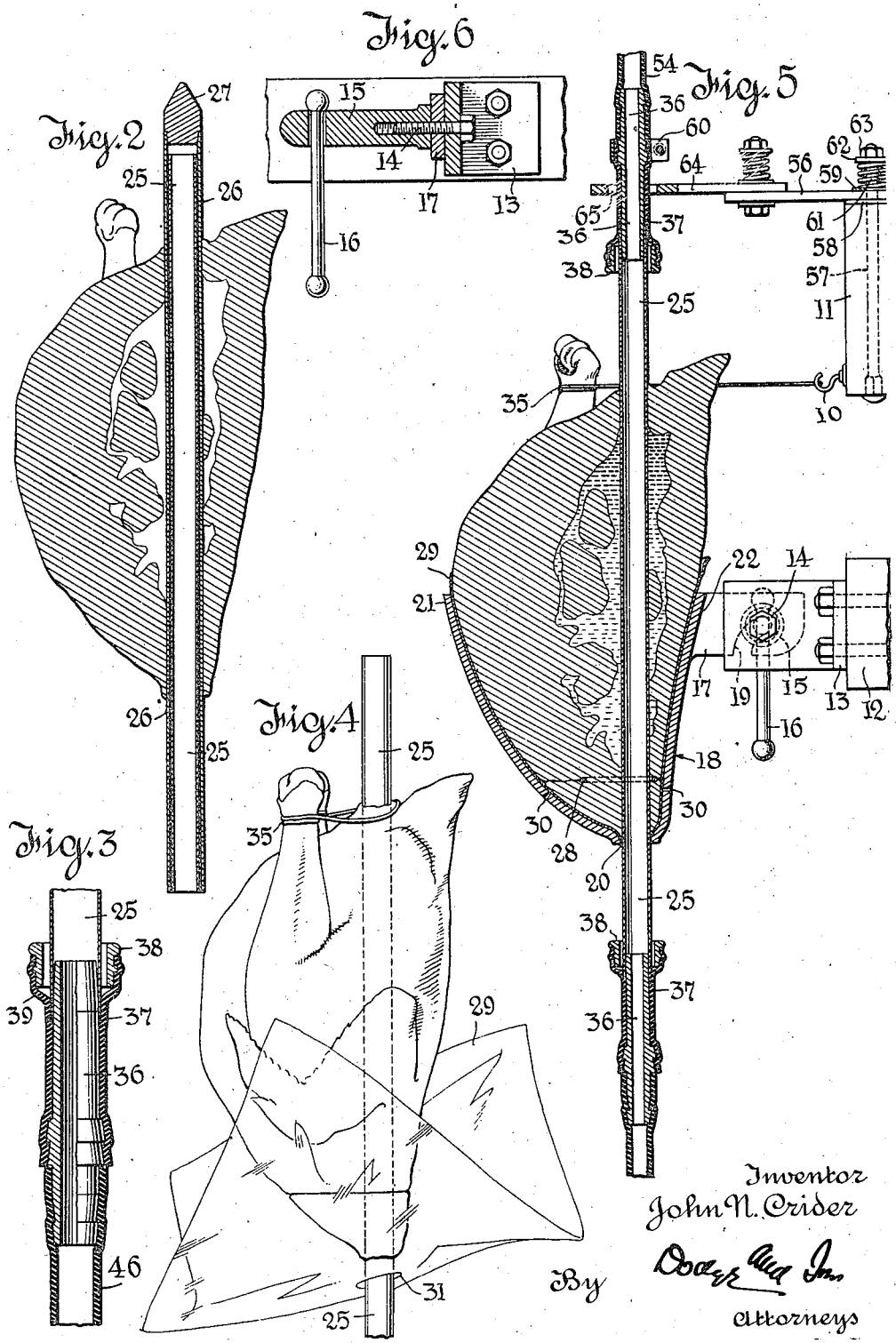

Patented Jan. 19, 1943

2,309,046

UNITED STATES PATENT OFFICE 2,309,046

APPARATUS FOR PRESERVING DRESSED AND DRAWN FOWL

John Nelson Crider, Sunnyside, Long Island, N. Y.

Original application December 12, 1936, Serial No. 115,617. Divided and this application February 17, 1941, Serial No. 379,351

9 Claims. (Cl. 62—114)

This invention pertains to improved apparatus for preserving dressed and drawn fowl by refrigeration.

The invention is an improvement over that disclosed and claimed in Letters Patent No. 1,797,606, granted to me under date of March 24, 1931. While the method and apparatus set forth in said patent proved satisfactory, the improved manner of handling the fowl as herein shown and described, has been found superior both as to facility of operation in carrying out the method, and the appearance and form of the final product.

Broadly considered, the invention employs the method set forth and claimed in the aforesaid patent, that is to say, the fowl is dressed and drawn, a tube for a freezing medium extended through the carcass and the cavity therein, the cavity filled with water, and the water thereafter frozen so that the fowl when the freezing has been completed, contains a block of ice which completely fills and conforms to the cavity within the fowl, and around and about the tube.

In the patent, as will be noted upon examination of the same, the fowl was suspended in space by its legs from hooks; whereas in the present case, the weight of the water filled fowl is supported in and by a form which, as the carcass is frozen, tends to maintain the proper shape or configuration, particularly of the breast and back of the carcass. Furthermore, there is no elongation and malformation of the carcass by reason of the fact that it is suspended by its legs, as was the case in the patent above referred to. On the contrary, the weight of the carcass plus the weight of the water placed in the cavity acts to settle the carcass within the mold, and thus acts to reshape the carcass, distortion of which may have been brought about through the cleaning and tube placing operations.

Moreover, in the present case, means is provided for readily inserting and positioning the freezing tube which passes through the cavity within the carcass. Means is likewise provided whereby the legs of the fowl are drawn inwardly close to the body, and the wings are also held close thereto, this latter through contact with the form or mold in which the carcass rests.

The tube in the present instance is produced from paper, paraffined or otherwise treated to render it impervious to the refrigerant which is forced therethrough, and likewise to inhibit any deleterious action upon the fowl where it contacts the same.

Means is also provided for preventing the carcass from being frozen to the form, and after the water within the cavity in the carcass is frozen, the carcass is submitted to a glazing operation, and finally placed in a bag which is impervious to air and which will have no deleterious effect upon the carcass which it surrounds.

With these and other objects and advantages in view, reference will be had to the annexed drawings, wherein—

Figure 1 is a perspective view of a portion of the apparatus whereby the method of the present case may be effected, it being understood that but two units are shown and that ordinarily a greater number will be placed upon the line;

Fig. 2, a transverse sectional view of a cleaned carcass of a fowl, showing the means employed for inserting the paper tube which is utilized as a conduit for the passage of the freezing medium;

Fig. 3, a longitudinal sectional view of one of the couplings employed in the line for effecting a tight joint between the end of the freezing tube and the respective inlet and outlet lines for the refrigerant;

Fig. 4, a side elevation of the carcass with the freezing tube extending therethrough and showing a sheet which is employed to prevent the carcass from freezing against the mold in which it is seated, the legs of the fowl being shown as drawn together as by a rubber band;

Fig. 5, a vertical sectional view taken through the carcass, showing water within the cavity thereof, the freezing tube extending therethrough, and the carcass seated within the combined mold and support; and Fig. 6, a detail view of the means employed to secure the mold in position with reference to a rack or support.

Inasmuch as the parts are duplicated throughout and ordinarily a plurality, say twelve or more of the forms will be connected in with a common line for the freezing medium as well as an exhaust line therefor, reference will be made to one complete unit throughout and the same reference letters will be applied in the different figures.

Referring first to Fig 1, 11 and 12 are bars which are secured to any suitable support, as for instance vertical studding or the like (not shown).

Secured to the bar 12 are L-shaped brackets 13, the forward element whereof (see more particularly Figs. 5 and 6) has an opening formed therein in which is mounted a machine screw 14 rigidly affixed to the forwardly extending member of bracket 13, so as to prevent rotation thereof.

On the outer end of the screw there is mounted a nut 15 carrying a bar 16 which is free to slide through the opening in which it is mounted and to afford ready means for tightening or loosening the nut. The nut and the forwardly extending member of the bracket are designed to coact with a member 17 extending rearwardly from the upper portion of the combined carcass mold and support, which is designated as a whole by 18.

As will be seen upon reference to Fig. 6, the nut 15 when screwed up upon the bolt, clamps the member 17 between it and the bracket element, and thus prevents rotation or drooping of the mold with reference to the bracket. The member 17 (see Fig. 5) is formed with a slot or opening 19 which facilitates engagement of the member 17 with the bolt 14 when it becomes necessary to change the mold for any reason, as for instance, change in size of the fowl being processed or change in species of fowl, which, as will be appreciated, vary in external contour.

The fastening means just described also facilitates ready alignment of the upper and lower tube connections hereinafter referred to, and facilitates adjustment of the fowl so as to effectuate the proper water level at the vent.

The mold 18 preferably takes the form shown in Figs. 1 and 5. It is produced from aluminum or suitable alloy and small vent openings, as 30, extend through the wall thereof. The lower end of the mold is provided with an opening 20 for the insertion and passage of the freezing tube shortly to be described.

Inasmuch as it is desirable to conform the breast of the fowl and to hold the wings in against the side of the body, the mold is given the shape so that the breast of the fowl may conform thereto and be distended outwardly to the full extent and the wings held close to the body. In other words, the forward portion of the mold is rounded as at 21, and the rear portion of the mold is likewise rounded and flared rearwardly at 22, the curvature being formed upon a greater radius than that of the forward portion 21. Intermediate the curved sections 21 and 22, each side of the mold is cut away as at 23 and 24, respectively, such cut-away portions permitting the thigh and main leg portion of the fowl to extend upwardly without undue compression. The wings, however, are held in place against the body by the mold.

The fowl, of course, is drawn, the cavity cleaned and washed out, and the bony part of the neck severed from the carcass. Such portion and the giblets are introduced into the cavity within the body. The fowl is then ready for the insertion of the freezing tube, denoted by 25. Such tube, as above indicated, is preferably made of paper, paraffined or otherwise treated to render it moisture-proof.

The tube is positioned within the fowl and extends through the cavity therein and outwardly above and below the carcass. The tube is, of course, fragile, and to facilitate its introduction and passage into and through the carcass, there is preferably used a metallic tube 26 of larger interior diameter than the exterior diameter of the tube 25, said tube 26 being provided with a point or sharpened end 27.

The paper tube 25 is first inserted or housed within the outer metallic tube 26, which is of slightly greater length than the paper tube, as indicated in Fig. 2. The tube 26 is then forced into and through the carcass, the point of introduction being close to the neck, the bony portion of which as above indicated, has been severed from the body. The paper tube which is housed within the metallic tube is, of course, carried along with the metallic tube as it passed through the carcass from the neck portion out through the vent. It is then in the position shown in Fig. 2. Thereupon, the tube 26 is withdrawn, but prior to its withdrawal, an elastic band as 28 is pushed over the skin of the neck of the fowl, and when this is done, the positioning tube 26 is withdrawn. This leaves the paper tube 25 in position with the skin of the neck and perhaps also a portion of the flesh adjacent the neck held tightly against and around the freezing tube at this point.

A sheet of Sylphrap, Cellophane or the like, as indicated by 29, having an opening 31 formed therein, is then positioned around that portion of the carcass adjacent the neck, the opening 31 facilitating the passage of the tube 25 therethrough. This sheet is drawn up and folded against the carcass by hand, after which the carcass with the tube 25 therein is placed neck downward in the mold, as indicated in Figs. 1 and 5.

The cavity within the carcass is then filled with pure cold water by any suitable means, as for instance by a nozzle 32 carried by a hose 33 which, in turn, is attached to a water line or main 34 supported in any suitable manner with reference to the molds. The water fills up all cavities within the carcass and as it is frozen, tends to expand slightly, which, of course, assists in a measure in conforming the carcass to the mold.

As indicated at the outset, the legs of the fowl will be drawn closely to the sides of the carcass by extending a rubber band as 35 over and between the same. (See Figs. 1, 4 and 5.) This band is drawn tightly about and around the legs of the carcass and passes rearwardly to and over a hook 10 extending outwardly from the rail or bar 11. The band when thus positioned, is under tension and has a tendency to draw the legs in against the carcass toward the vent opening, bringing the parts to the position approximating that which they would assume were the fowl trussed.

Any suitable means may be employed for passing a freezing medium through the tubes 25. In order to facilitate ready connection and disconnection of the upper and lower ends of the tube 25 with the suction and pressure lines, couplings such as best shown in Fig. 3 will preferably, but not necessarily, be employed. Such an arrangement includes an elongated metallic tubular member 36 having that end thereof which extends toward the tube 25 externally tapered and of a diameter such that it will pass readily into the open end of the tube 25. The member 36 is mounted in the end of a tubular rubber member 37 molded to form with the upper portion somewhat enlarged so as to permit the insertion of a metallic ring-shaped member 38 therein, the parts being held against separation by the usual groove and channel connection.

As will be seen, the member 38 extends downwardly and around the tapered or spigot end of the member 36, in spaced relation thereto, and the rubber element 37 is free of contact with the lower edge of the member 38 and the adjacent portion of the spigot-like member 36. This enables the operator to depress the ring-shaped member 33 and to insert the end of the tube 25 inwardly of said member, the end of the tube 25 coming into contact with the wall of the spigot 36 and the interior face of the tubular rubber member. In other words, when the member 33 is depressed, the bowed portion of the rubber member 37, which bowed portion is denoted by 39, is carried downwardly and away from the tapered spigot, allowing the end of the tube 25 to pass therebetween.

Upon release of the member 38, the inherent resiliency of the rubber will carry the parts to the position shown in Fig. 3, with the end of the tube 25 held in close binding contact with the spigot and the surrounding sleeve or element 37. This arrangement facilitates quick coupling and uncoupling of the tube 25 with the spigot member. The same arrangement is utilized at both ends of the tube 25.

The tube 25, as will be seen upon reference to Figs. 1 and 5, extends quite an appreciable distance beyond the carcass at the upper and lower portions thereof.

As above indicated, any suitable means may be employed for passing freezing medium through the tube 25. In the instant case, brine at a temperature of from 3° to 5° below zero, and at approximately 20 lbs. pressure, is employed. This has given highly satisfactory results in commercial operation.

To introduce and drain the brine from the tubes 25, the following layout is utilized: A pressure line 41 is connected through a branch 42, valve 43, T 44, nipple 45, and a rubber tube 46 with the lower end of the tubular member 36. A suction drain line is also present and is denoted by 48. It is interconnected with the T 44 through a nipple 49, valve 51 and a branch or lateral 52. The upper end of the freezing tube 25 is, as above noted, connected with a suction main denoted by 53. Such connection is had in the following manner: A coupling of the type above described and as shown in Fig. 3, is attached to the upper end of the freezing tube 25. At its opposite end the coupling is connected to a flexible pipe 54 which is in communication with the suction main 53, said main, moreover, being provided with a vent pipe 55 (Fig. 1).

Fowls, of course, vary in size, hence the upper coupling which is to be temporarily attached to the freezing tube is preferably adjustably supported or held in position, in order that it may be readily aligned with the upper end of the tube 25. To this end, and to allow the coupling to have a slight movement relative to said support, the following structure is utilized: An arm 56 is mounted upon the rail or bar 11 by a bolt 57 which passes through a washer 58 lying between the bar 11 and the under face of the arm 56. A washer 59 rests upon the upper face of the arm and a coil spring 61 encircles the upper portion of the bolt 57 and is held in place by a washer 62 and a nut 63, see Fig. 5.

The outer end of the arm 56 is attached by a bolt and spring connection similar to that just described, to a second arm 64, said arm at its outer portion having an opening 65 formed therein through which extends the rubber sleeve 37 of the detachable coupling, these parts being secured together by an ordinary hose clamp, as 66. This hose clamp prevents the detachable coupling and the tube 54 from dropping downwardly through the opening 65 when no paper tube is connected to the lower portion of the detachable coupling.

As will be best seen upon reference to Figs. 1 and 5, the opening 65 is sufficiently large to allow slight movement of the coupling with reference to the arm which normally positions the coupling in alignment with the tube 25. The springs tend to hold the arms 56 and 64 in their adjusted position with reference to each other and to the detachable coupling.

In operation, when the carcass with the Sylphrap sheet is placed in the mold, the openings 30 permit the drainage of any water from the form or mold which may run over when the operator is filing the cavity within the carcass. Such openings also facilitate the expulsion of air between the sheet and the mold when the sheet is forced downwardly against the mold by the full weight of the carcass.

The couplings being properly connected to the freezing tube, brine is passed upwardly through such tube to the suction main 53, at the temperature and pressure above indicated, and with an ordinary size chicken, the water within the cavity will be completely frozen and the body of the chicken likewise frozen to a considerable degree. When this stage is reached, valve 43 will be closed and valve 51 opened, so as to drain the brine from the tube 25.

When the valves are manipulated as just indicated, the paper tube is severed, it being cut close to the lower end of the mold or form, while leaving a projecting portion of say ¾" in length above the carcass. It will, of course, be appreciated that the section of the freezing tube which remains within the carcass contains no ice or water, and if a liquid freezing medium be employed, it will drain therefrom immediately the tube is cut as just indicated.

The carcass may then be lifted from the mold, and the Sylphrap sheet 29 stripped therefrom. This sheet facilitates the removal of the fowl from the mold, as it prevents the carcass from being frozen to the same, which, if such freezing occurred, would tend to tear the skin and flesh of the fowl when one sought to separate the carcass from the mold. Hence, it will be seen that the carcass is conformed to the mold by its weight and the weight of the contained water which is transformed into ice, and it will be found that the carcass when so removed is free of any blemishes and has the same form and contour as does a well trussed fowl.

It will be appreciated, of course, that those portions of the tube 25 which remain in the respective couplings after severance of such member, will be withdrawn from such couplings immediately after the removal of the frozen carcass, or just prior to placing the next fowl in position for processing the same.

The Sylphrap sheet, as above indicated, is removed, as is also the rubber band which positions the legs with reference to the body, and the fowl is then carried into what is known as the zero or hardening room. There it remains until the carcass becomes completely solidified and frozen dry.

When this stage is reached, the fowl is carried into the packing or processing room, where a temperature of about 28° F. obtains. The operator then pushes the projecting ends of the tube back into the tube itself, closing up the air passage therethrough. The fowl is then ready for glazing, which is effected by immersing the fowl, one or more times, into a pail of clear cold water, which upon each immersion forms an ice coating over the entire exterior of the carcass. The carcass is then slipped neck-foremost into a bag formed of Sylphrap or similar material which is more or less impervious to both air and moisture. The bag is then sealed. This completes the operation.

A fowl thus processed may be kept for a long period of time provided it is maintained in cold storage. The fact that the fowl is cleaned shortly after it is dressed, and is then processed as above outlined, makes for the production of a product of high quality on every score.

By the method above set forth, the fowl is cleaned and dressed, ready for be cooked without further cleaning or dressing, as soon as the block of ice is melted or removed along with the paper freezing tube.

The utilization of a paper tube or conduit is advantageous from many points of view. Such tubes are sanitary and will impart no flavor to the fowl. The tube, moreover, does not have to be withdrawn until the fowl is to be cooked, and the fact that it is made of paper facilitates the turning in of the ends thereof, so as to close the tube against the ingress of any foreign substance.

This application is a division of my application Serial No. 115,617, filed December 12, 1936, which has matured into Patent No. 2,231,886.

What is claimed is:

1. In an apparatus for treating and shaping dressed and drawn fowl, the combination of a mold adapted to support the body portion of the carcass of a fowl to be processed, said mold including a portion contoured to the shape of the normally appearing breast of the fowl and having an opening in its lower end; a tubular member passing through said opening, and adapted to pass through the carcass and the cavity therein; means for supporting said member in fixed relation to said mold; and means for passing a refrigerant through said tube.

2. In an apparatus for treating and shaping dressed and drawn fowl, the combination of a mold adapted to support the body portion of the carcass of a fowl to be processed, said mold including a portion contoured to the shape of the normally appearing breast of the fowl and having an opening in its lower end; a tubular member passing through said opening, and lengthwise through the mold cavity; means adapted for providing a water-tight connection between the tube and that portion of a carcass which lies within the lower portion of the mold when a fowl is being processed; and means for passing a refrigerant through said tube.

3. In an apparatus for treating and shaping dressed and drawn fowl, the combination of a mold adapted to support the body portion of the carcass of a fowl to be processed, said mold including a portion contoured to the special shape of the normally appearing breast of the fowl, said mold having an opening in its lower end; a plurality of smaller openings extending through the body of the mold above said lower end; a liner of water-resistant and non-adhesive character adapted to be forced into contact with the inner wall of the mold by a carcass when such carcass is placed within the mold; and a tube for a refrigerant passing upwardly through the lowermost opening in the mold and through the mold cavity.

4. In an apparatus for treating dressed and drawn fowl, the combination of a mold adapted to sustain the carcass of a fowl to be processed; a tube passing upwardly through the mold cavity; means for supplying refrigerant to said tube; and a connection between said means and the tube comprising a spigot member of a diameter to enter the end of the tube, a rubber sleeve surrounding the spigot in spaced relation thereto at that end which enters the tube, a ring-shaped element mounted in the outer free end of said rubber sleeve affording means whereby the sleeve may be depressed or moved longitudinally with reference to the spigot whereby the end of the tube may be introduced over the spigot and held between the rubber element when the endwise pressure thereon is relieved.

5. In an apparatus for treating dressed and drawn fowl, the combination of a mold; means for supporting the mold; a paper tube extending upwardly through the bottom of the mold and adapted to pass through the cavity of a carcass seated in the mold; a refrigerating system interconnected with said tube, said connection at the upper end of the tube comprising a flexible member; and an adjustable support surrounding said flexible member.

6. In an apparatus for preserving the carcass of a dressed and drawn fowl, the combination of an open top mold shaped to simulate the normal contour of the breast and back of a fowl to be processed, said mold having an opening in its lower end; a support for the mold; a circuit for a freezing medium, said circuit having normally open terminals above and below the mold; a freezing tube of material impervious to the action of the freezing medium and water, said tube passing upwardly through the opening in the mold, lengthwise through the mold cavity, and likewise extending below the mold and beyond the upper portion of the mold; and detachable means interconnecting the tube ends with the terminals aforesaid.

7. In an apparatus for treating and shaping dressed and drawn fowl, the combination of a mold adapted to support the body portion of the carcass of a fowl to be processed, said mold including a portion contoured to simulate the shape of the normally appearing breast of the fowl and having an opening in its lower end, said mold also being perforated to permit air discharge when a carcass is positioned therein; a tubular member passing through said opening, and adapted to pass through the carcass and the cavity in the carcass; and means for passing refrigerant through said tube.

8. In an apparatus for preserving the carcass of a dressed and drawn fowl, the combination of an open top mold conformed to simulate the normal contour of the breast and back of a fowl to be processed, said mold having an opening in its lower end; a support for the mold; a circuit for a freezing medium, said circuit having normally open terminals above and below the mold; a freezing tube of material impervious to the action of the freezing medium and water, said tube passing upwardly through the opening in the mold, lengthwise through the mold cavity, and likewise extending below the mold and beyond the upper portion of the mold; flexible conduit means including a coupling for attaching the uppermost terminal of said freezing circuit to the upper end of the freezing tube; and detachable means for connecting the lower terminal of the freezing circuit to the lower end of said freezing tube.

9. In an apparatus for preserving the carcass of a dressed and drawn fowl, the combination of an open top mold conformed to simulate the normal contour of the breast and back of a fowl to be processed, said mold having an opening in its lower end; a support for the mold; a circuit for a freezing medium, said circuit having normally open terminals above and below the mold; a freezing tube of material impervious to the action of the freezing medium and water, said tube passing upwardly through the opening in the mold and beyond the upper portion of the mold and likewise extending below the mold; detachable means interconnecting the tube ends with the terminals aforesaid, said means including a flexible conduit and a coupling between the uppermost terminal of said freezing circuit and the upper end of the freezing tube; and holding means permitting shifting of said flexible conduit to align the coupling carried thereby with the upper end of the freezing tube.

JOHN NELSON CRIDER.